(12) United States Patent
Feldtkeller

(10) Patent No.: US 6,744,241 B2
(45) Date of Patent: Jun. 1, 2004

(54) METHOD FOR DRIVING A SWITCH IN A SWITCH-MODE CONVERTER, AND A DRIVE CIRCUIT FOR DRIVING A SWITCH

(75) Inventor: Martin Feldtkeller, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/457,663

(22) Filed: Jun. 9, 2003

(65) Prior Publication Data

US 2003/0227279 A1 Dec. 11, 2003

(30) Foreign Application Priority Data

Jun. 7, 2002 (DE) .......................... 102 25 406

(51) Int. Cl.⁷ .................................. G05F 1/70
(52) U.S. Cl. .................. 323/207; 323/222; 323/285; 323/288
(58) Field of Search ................. 323/222, 285, 323/288

(56) References Cited

U.S. PATENT DOCUMENTS

| 6,034,513 A | 3/2000 | Farrington et al. |
| 6,069,470 A | 5/2000 | Feldtkeller |
| 6,191,565 B1 * | 2/2001 | Lee et al. ............ 323/222 |
| 6,307,361 B1 | 10/2001 | Yaakov et al. |

FOREIGN PATENT DOCUMENTS

DE    197 25 842 A1    1/1999

OTHER PUBLICATIONS

Hwang, J. et al.: "New Universal Control Methods for Power Factor Correction and DC to DC Converter Applications", IEEE, 1997, pp. 59–65.
Ben–Yaakov, S. et al.: "PWM Converters with Resistive Input", IEEE Transactions on Industrial Electronics, vol. 45, No. 3, Jun. 1998, pp. 519–520.

* cited by examiner

*Primary Examiner*—Shawn Riley
(74) *Attorney, Agent, or Firm*—Laurence A. Greenberg; Werner H. Stemer; Ralph E. Locher

(57) ABSTRACT

The present invention relates to a method and to a drive circuit for driving a switch in a switch-mode converter that has input terminals for supplying an input voltage and output terminals for providing an output voltage. The method includes a step of providing a threshold signal, which is dependent on a quotient of a first signal (which is dependent on an input current to the switch-mode converter) and a second signal (which is dependent on the output voltage Uout). The method also includes a step of providing a ramp signal synchronous in time with a clock signal. The slope of the ramp signal is dependent on the output voltage. The method also includes a step of comparing the threshold signal with the ramp signal and driving the switch as a function of the comparison result.

25 Claims, 7 Drawing Sheets

FIG 3
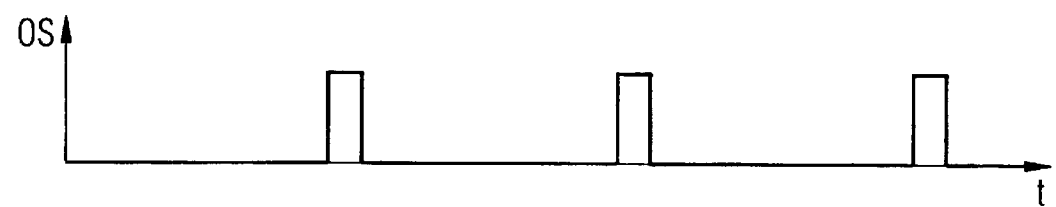
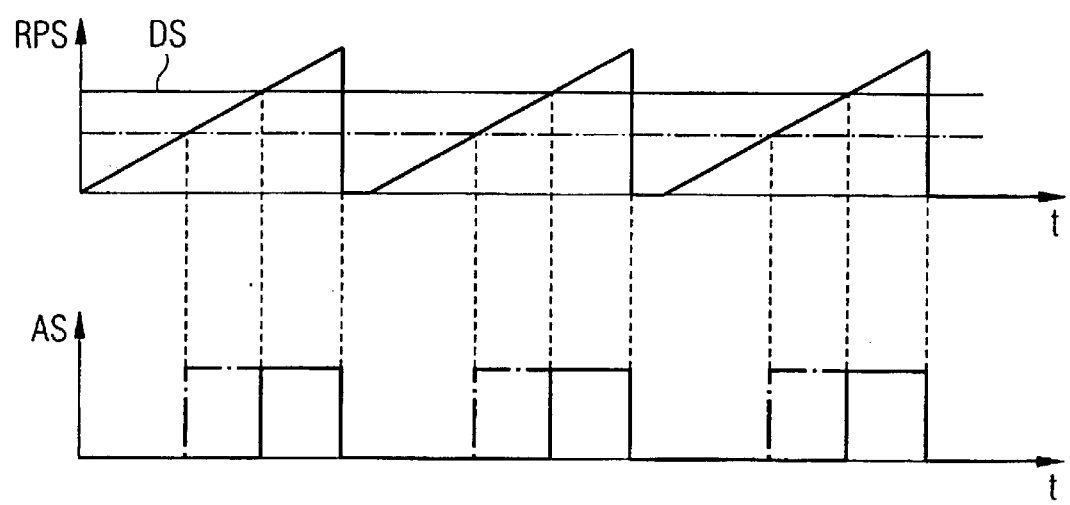

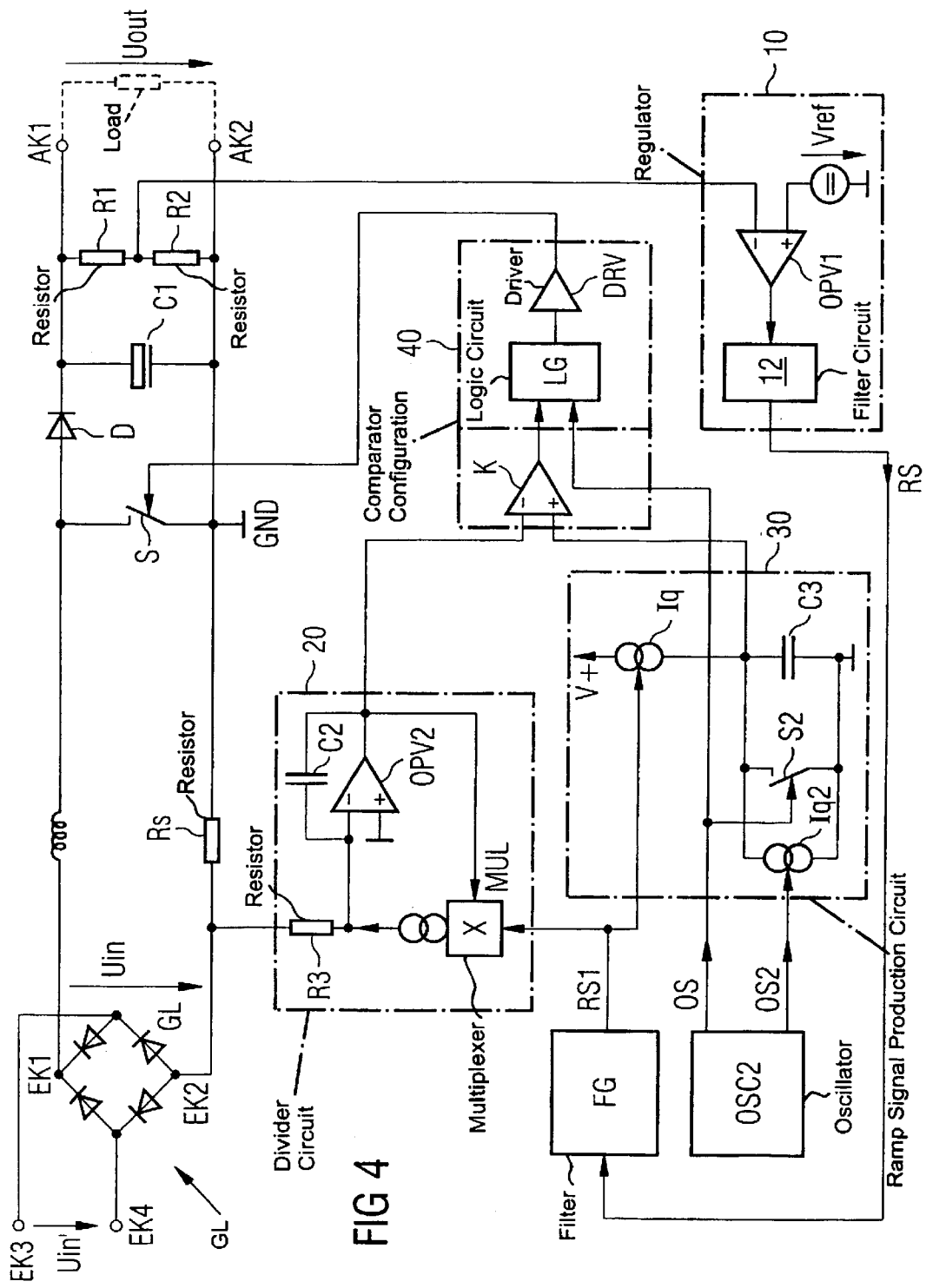

FIG 7
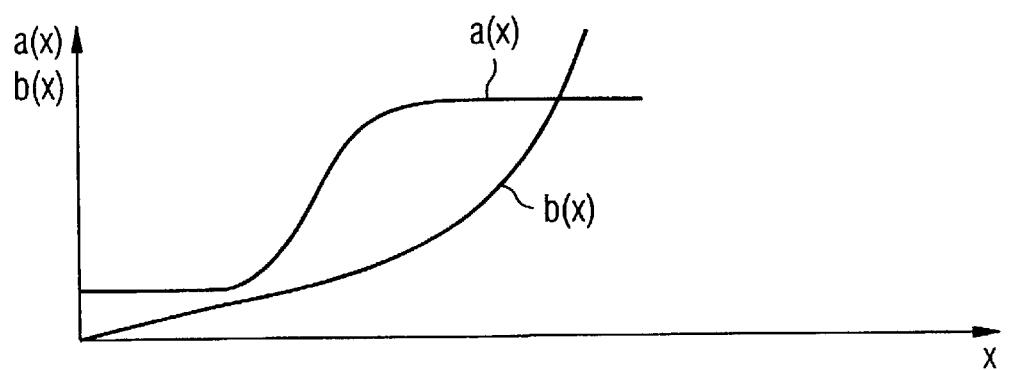

METHOD FOR DRIVING A SWITCH IN A SWITCH-MODE CONVERTER, AND A DRIVE CIRCUIT FOR DRIVING A SWITCH

BACKGROUND OF THE INVENTION

Field of the Invention

The present invention relates to a method for driving a switch in a switch-mode converter and also relates to a drive circuit for a switch in a switch-mode converter. The method includes: producing a threshold signal, producing a ramp signal synchronized with a clock signal such that the slope of the ramp signal is dependent on the output voltage of the converter, and comparing the threshold signal with the ramp signal and driving the switch as a function of the result of the comparison.

A method such as this and an apparatus such as this are known from U.S. Pat. No. 6,307,361. In the known method and the known apparatus, a signal that is dependent on an input current to a switch-mode converter is compared with a pulsed ramp signal or a sawtooth waveform signal. The pulsed ramp signal or the sawtooth waveform signal has a slope that is dependent on the output voltage of the switch-mode converter. A switch, which controls the power consumption of the switch-mode converter is in this case pulsed, and is driven as a function of a comparison of the threshold signal with the ramp signal. The switch is switched on when the ramp signal reaches the value of the threshold signal and is switched off when the ramp signal is reset. When the input voltage of the switch-mode converter rises during this process, then the period for which it is switched on decreases, in order to keep the power consumption constant. When the output voltage falls because of an increase in the power consumption of any load that is connected to the switch-mode converter, then the period for which it is switched on increases, in order to increase the power consumption, and thus to readjust the output voltage.

In the case of the known method and the known apparatus, the input current and hence the threshold signal are inversely proportional to the square of the input voltage. The input voltage is normally a sinusoidal voltage or a voltage with a sinusoidal magnitude, at a frequency that is considerably lower than the clock frequency of the switch. If the root mean square value of the input voltage varies between 90 V and 270 V (=3·90 V), as is the case for switch-mode converters in so-called wide area network sections, then, because of the input voltage, this results in a dynamic range for the threshold value of $1:3^2$, or 1:9. Furthermore, if the output voltage is constant, the input current is proportional to the power emitted to the load. If, by way of example, this power consumption varies by a factor of 1:20, then these fluctuations result in the threshold value having a dynamic range of 1:20. In other words: when the input voltage is at its maximum root mean square value and the power consumption of the load is at its minimum, which is then the minimum threshold value $x_{min}$, then the maximum threshold value which occurs with the input voltage with the lowest root mean square value and with the maximum load power consumption is $x_{max}=180 \cdot x_{min}$.

The circuit configuration for producing the ramp signal must in this case be designed such that it produces a ramp signal which has just as wide a dynamic range, in order on the one hand to reach the threshold value in each clock period, and hence to switch on the switch. Furthermore, the comparator must be designed to produce an exact comparison result over this dynamic range.

The switch-mode converter taught in U.S. Pat. No. 6,307,361 is in the form of a boost converter, whose power consumption increases as the period for which the switch is switched on in each clock period increases.

A method for driving a switch in a switch-mode converter in the form of a boost converter is known from Sam Ben-Yaakov, Ilya Zeltser: "PWM Converters with Resistive Input", IEEE TRANSACTIONS ON INDUSTRIAL ELECTRONICS, VOL. 45, NO. 3, June 1998, in which the input current on the network side is filtered and is multiplied by a controlled variable that is dependent on the output voltage. The multiplication signal that is formed is compared with a ramp signal or sawtooth waveform signal, in order to define periods during which the switch in the switch-mode converter is switched off, on the basis of the comparison result. In this method, when the input voltages have a high root mean square value and the loads are low, the controlled variable that is dependent on the output voltage would have to be very large, so that a multiplier with a very wide linearity range is required, and this can be produced only with a high degree of circuitry complexity.

A method is likewise known from Hwang, Chee, Ki: "New Universal Control Methods for Power Factor Correction and DC to DC Converter Applications", IEEE, 1997, in which a threshold signal which is dependent on an input current to a switch-mode converter is compared with a ramp signal whose amplitude and slope are variable. The switch in the switch-mode converter is driven as a function of a comparison of the threshold signal with the ramp signal. In this method as well, the amplitude of the variable ramp signal would need to have a very wide dynamic range in order to reach the threshold signal, and hence to switch on the switch, once in each clock period. Furthermore, there are stringent requirements for the accuracy of the comparison configuration that compares these two signals, namely the threshold signal and the ramp signal, which have a wide dynamic range.

A method for driving a switch in a switch-mode converter is known from Published German Patent Application DE 10 725 842 A1, in which the instantaneous value of the output voltage is multiplied by a controlled variable that is dependent on the output voltage. A difference signal between the multiplication signal and a signal that is dependent on the input current is supplied to a pulse width modulator in order to produce drive signals for the switch. An exponential transfer function is in this case applied to the control signal before it is supplied to the multiplier.

SUMMARY OF THE INVENTION

It is accordingly an object of the invention to provide a method and a drive circuit for driving a switch in a switch-mode converter, which overcome the above-mentioned disadvantages of the prior art apparatus and methods of the general type in which a threshold signal is compared to a ramp signal that is dependent on an output voltage of the switch-mode converter, and in which the switch in the switch-mode converter is driven as a function of the result of the comparison.

In particular, an object of the invention is to provide a method and a drive circuit of the type mentioned above that can be used in switch-mode converters having a predetermined dynamic range for the input voltage and having a predetermined dynamic range for the power consumption of the load.

With the foregoing and other objects in view there is provided, in accordance with the invention, a method for driving a switch in a switch-mode converter having input terminals for supplying an input voltage and output terminals for providing an output voltage. The method includes the following steps: producing a threshold signal dependent on a quotient of a first signal dependent on an input current to the switch-mode converter and a second signal dependent on the output voltage; producing a ramp signal synchronously in time with a clock signal, the ramp signal having a slope dependent on the output voltage; and obtaining a comparison result by comparing the threshold signal with the ramp signal and driving the switch as a function of the comparison result.

Using a threshold signal that is dependent on the quotient of a signal, which is dependent on the input current, and a signal, which is dependent on the output voltage, reduces the dynamic range of the threshold signal. This results in the ramp signal likewise having a narrower dynamic range, thus also reducing the requirements for a comparator circuit that carries out a comparison between the threshold signal and the ramp signal.

One embodiment of the method provides for a control signal that is dependent on the output voltage to be produced, with the second signal (which is dependent on the output voltage) being related to this control signal via a nonlinear characteristic. This nonlinear characteristic is preferably an exponential characteristic. This improves the overall control response, particularly when major changes occur in the input voltage, as has already been described in principle in Published German Patent Application DE 197 25 842 A1.

One embodiment of the invention also provides for the slope of the ramp signal to be related to the control signal (which is dependent on the output voltage) via a nonlinear characteristic, preferably an exponential characteristic, and this is likewise used to improve the overall control response.

The control signal is preferably formed by forming the difference between a reference voltage signal and a signal that is proportional to the output voltage, and by subsequently filtering the difference signal. The regulator that is used to form a control signal such as this is preferably a proportional regulator or a proportional integral regulator.

The second signal, which has a reciprocal to which the threshold signal is proportional, and the slope of the ramp signal can be related to this control signal via the same characteristic.

Another embodiment of the invention provides for the second signal and the slope of the ramp signal to be related to the control signal via different characteristics, with the product of these two characteristics preferably producing an exponential characteristic.

The method is used in particular for driving a switch in a switch-mode converter in the form of a boost converter. The switch preferably is switched on when the ramp signal reaches the threshold signal, and is switched off synchronously in time with a clock signal that governs the period duration of the individual ramps. In the case of a boost converter, the power consumption increases as the time for which this switch is switched on increases. Conversely, the power consumption falls when the switch is in each case closed for only a fraction of the period duration during each clock period. In the context of the present invention, the expression "ramp signal" refers to a signal that rises periodically at the start of a period duration, or after a predetermined time following the start of the period duration, and which is reset at the end of the period duration to an initial value. Short switched-on times are in this case achieved when the slope of the ramp signal and the amplitude value of the threshold signal are matched to one another such that the ramp signal does not reach the threshold value until shortly before the end of the period duration. That is to say, when there is little difference between the amplitude of the threshold signal and the maximum amplitude value of the ramp signal that can be reached during one period. If parasitic effects result in minor fluctuations in the threshold signal when the power consumption is low, then it is possible for the switch to be closed too early, or not at all, during one period duration, which is detrimental to the control of the output voltage. In order to prevent this, one embodiment of the invention provides for the slope of the ramp signal to increase for a predetermined time period before the resetting of the ramp signal, in order in this way to ensure that the ramp signal reaches the value of the threshold signal, preferably at the end of a clock period, so that there is a greater probability of the switch finally being switched on within each clock period. The increase in the slope of the ramp signal shortly before the resetting of the ramp signal may in this case be predetermined to be constant, or may be dependent on the output voltage or on a control signal that is dependent on the output voltage.

Before the comparison with the ramp signal, the threshold signal is preferably subjected to low-pass filtering with a cut-off frequency that is dependent on the second signal. This means that the power factor correction of the switch-mode converter is improved when the power consumption is low, when the switch-mode converter is operating in the discontinuous current mode (DCM), and that it is possible for the current control loop to achieve a high degree of stability when the power consumption is high, when the switch-mode converter is operating in the continuous current mode (CCM).

The drive circuit for a switch in a switch-mode converter has a threshold signal production circuit which is in the form of a divider circuit. The threshold signal production circuit is supplied with a first signal that is dependent on an input current to the switch-mode converter and on a second signal that is dependent on the output voltage of the switch-mode converter, and the threshold signal production circuit produces an output signal which is dependent on the quotient of the first signal and of the second signal. The drive circuit also has a ramp signal production circuit, which produces a ramp signal in time with a clock signal, with the slope of the ramp signal being dependent, at least in places, on the output voltage, and a comparator circuit to which the threshold signal and the ramp signal are supplied and which produces an output voltage as a function of which the switch is driven.

In one exemplary embodiment, the divider circuit includes a low-pass filter with a cut-off frequency that is dependent on the second signal, and at whose output the threshold signal is produced. This low-pass filter makes it possible to positively influence the power factor correction of the switch-mode converter when the power consumption is low, and to positively influence the control stability of the current control loop when the power consumption is high.

A current detection resistor is preferably provided for producing a signal that is dependent on the input current to the switch-mode converter. This current detection resistor is connected in the input circuit of the switch-mode converter, and one of its connections is connected to the divider circuit. The divider circuit preferably includes a multiplier, to one of whose inputs the second signal is supplied and to whose other input the threshold signal is supplied. The multiplier produces at its output, a current that is dependent on the product of the second signal and of the threshold signal. The divider circuit also has a resistor, which is connected between the output of the multiplier and the current detection resistor, and a differential amplifier. One of the inputs of the differential amplifier is connected to the output of the multiplier, and the other input is connected to a reference ground potential. The output of the differential amplifier provides the threshold signal. The reference ground potential is preferably also the potential with respect to which the output voltage is produced and to which that connection of the current detection resistor that is remote from the divider circuit is connected. The current detection resistor, the multiplier with the downstream resistor and the differential amplifier operate as a control loop, with the current which is supplied from the multiplier always being set such that the voltage drop across the resistor that is connected downstream from the multiplier corresponds to the voltage drop across the current detection resistor, so that the current which is supplied by the multiplier is proportional to the input current to the switch-mode converter. If the voltage drop across the current detection resistor and the output current of the multiplier are regarded as a first signal, then this first signal is obtained from the product of the threshold signal and the second signal, and the threshold signal is then obtained from the quotient of the first signal and of the second signal.

In one embodiment of the drive circuit, the output of the differential amplifier is fed back via a capacitive circuit to the input of the differential amplifier, which is connected to the output of the multiplier. This results in a low-pass response with a cut-off frequency that is dependent on the second signal.

In one embodiment of the invention, a filter having a nonlinear characteristic is provided, to whose input, a signal which is dependent on the output voltage is supplied and at whose output the second signal is available. This filter preferably has an exponential characteristic.

The signal that is dependent on the output voltage and is supplied to the filter, or which can be supplied to the divider directly as a second signal and to the ramp signal production circuit indirectly in order to adjust the slope of the ramp signal, is preferably available at the output of a regulator that is in the form of a proportional regulator or proportional integral regulator, and to which a voltage signal which is proportional to the output voltage is supplied.

In a further embodiment, a filter is provided to which a signal that is dependent on the output voltage, in particular the signal which is produced at the output of the regulator, is supplied and which produces the second signal and a slope signal. The slope signal is in this case supplied to the ramp signal production circuit in order to adjust the slope of the ramp signal. The product of the second signal and the slope signal is related to the filter input signal via a nonlinear characteristic, preferably an exponential characteristic.

The provision of filters such as these with nonlinear characteristics improves the overall control response of a switch-mode converter with the inventive drive circuit, in particular when sudden changes occur in the input voltage to the switch-mode converter.

The oscillator signal is supplied by an oscillator circuit. The ramp signal production circuit produces the ramp signal synchronous in time with the oscillator signal. This oscillator circuit preferably produces a second oscillator signal, which is supplied to the ramp signal production circuit. The ramp signal production circuit is designed such that the slope of the ramp signal can be increased synchronously with the second oscillator signal, thus making it possible to ensure that the switch is closed once in each clock period even when the power consumption is low, which has a positive effect on the stability response of a switch-mode converter with the drive circuit according to the invention.

Other features which are considered as characteristic for the invention are set forth in the appended claims.

Although the invention is illustrated and described herein as embodied in a method for driving a switch in a switch-mode converter, and a drive circuit for driving a switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a collection of graphs showing the time profiles of some of the signals shown in FIG. 2;

FIG. 4 is a circuit diagram of a second embodiment of the drive circuit;

FIG. 7 is a collection of graphs showing transfer functions for the filter shown in FIG. 6.

DESCRIPTION OF THE PREFERRED EMBODIMENTS

Unless stated to the contrary, identical reference symbols denote identical parts with the same significance in the figures.

Figure 1:
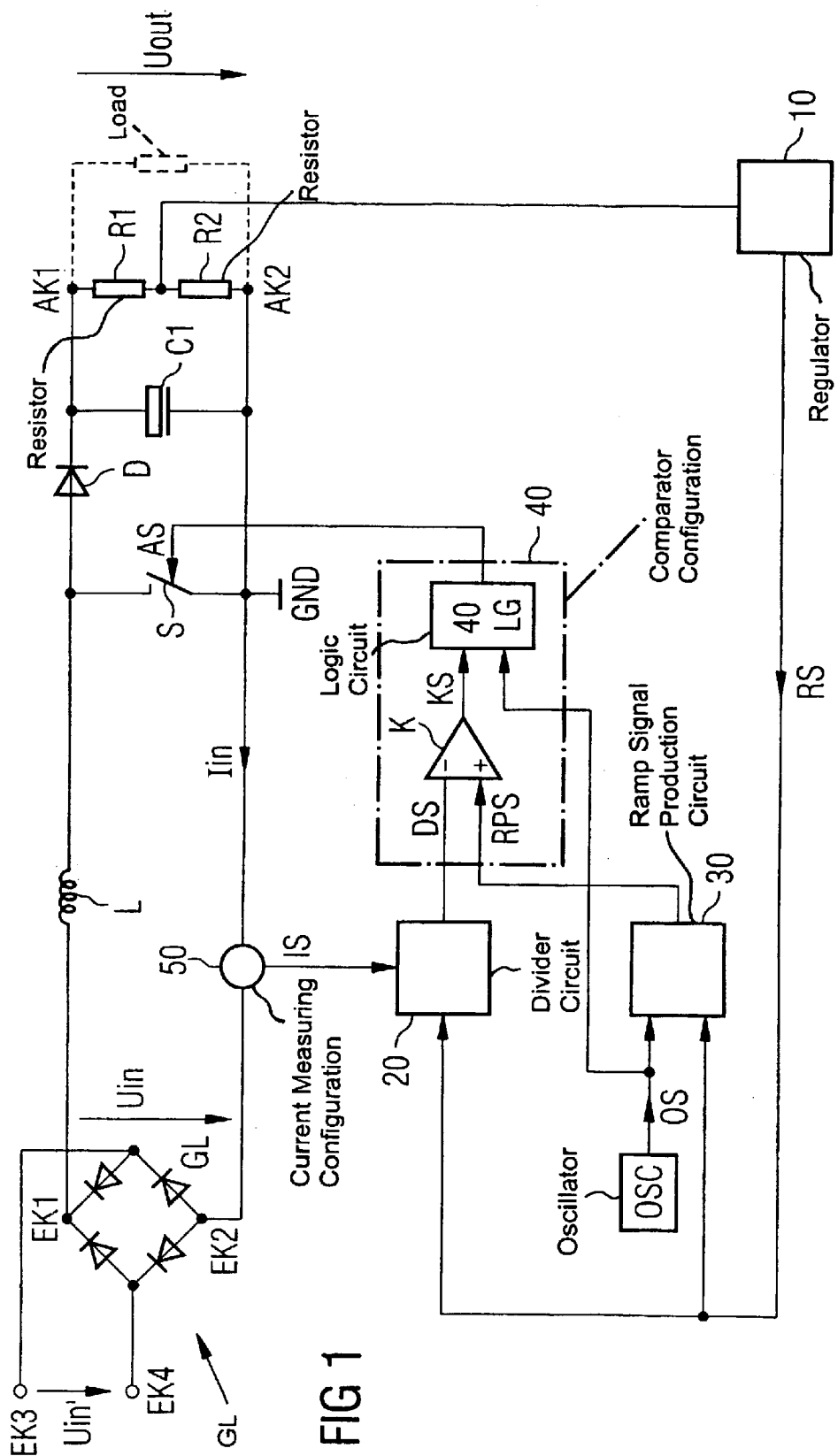
FIG. 1 is a circuit diagram of a switch-mode converter with a drive circuit having a divider circuit, a ramp signal production circuit, and a comparator circuit.

Referring now to the figures of the drawing in detail and first, particularly, to FIG. 1 thereof, there is shown an exemplary embodiment of a switch-mode converter with an inventive drive circuit. The switch-mode converter has input terminals EK1, EK2 for the application of an input voltage Uin, and output terminals AK1, AK2 for producing an output voltage Uout for a load. In the exemplary embodiment, the input voltage Uin is formed from a power supply system input voltage Uin' by a bridge rectifier GL. The power supply system input voltage Uin' is normally a sinusoidal voltage at a frequency of 50 Hz or 60 Hz and has a root mean square value of between 90 V and 265 V, or a voltage amplitude of between 172 V and 374 V, which may vary depending on the country. The input voltage Uin is accordingly a voltage with a sinusoidal magnitude.

The object of the switch-mode converter is to convert this input voltage Uin with a sinusoidal magnitude to a constant output voltage Uout which is as independent of the load as possible, and in the process to produce an input current Iin which is at least approximately proportional to the input voltage Uin.

The switch-mode converter which is illustrated in FIG. 1 is in the form of a boost converter having a series circuit with a coil L and a switch S between the input terminals EK1, EK2. A rectifier configuration has a diode D and an output capacitor C1 connected in series and this rectifier configuration is connected in parallel with the switch S. The output voltage Uout can be tapped off across the output capacitor C1, which is connected between the output terminals AK1, AK2, and to which a load that is shown by dashed lines can be connected. When the switch S is closed, the coil L draws power via the input voltage Uin, and, when the switch S is then opened, the coil L emits this power via the diode D to the output capacitor C1 and to the output terminals AK1, AK2. The switch S is opened and closed on a clock basis, where the duty cycle, that is to say the ratio of the time period for which the switch is closed to the period duration, governs the power consumption of the switch-mode converter.

On the assumption that the clock frequency at which the switch is driven in a clocked manner is considerably higher than the frequency of the input voltage Uin, the mean value of the input current Iin will be proportional to the instantaneous value of the input voltage Uin. As the clock frequency rises, this proportionality applies not only to the mean value of the input current Iin but also to the instantaneous value of the input current Iin.

The drive circuit for driving the switch S, which produces a pulsed drive signal AS, has a divider circuit 20, to which a first signal IS (which is dependent on the input current Iin) and a second signal RS (which is dependent on the output voltage Uout) are supplied. The divider circuit 20 has an output providing a threshold signal DS that is supplied to a comparator configuration 40. This threshold signal DS is dependent on the quotient of the first signal IS (which is dependent on the input current) and of the second signal RS (which is dependent on the output voltage Uout).

In the exemplary embodiment, the first signal IS is produced by a current measurement configuration 50, which is connected to the input circuit of the switch-mode converter. The second signal RS (which is dependent on the output voltage Uout) is produced by a regulator 10 that is supplied with a signal that is proportional to the output voltage Uout. This signal that is proportional to the output voltage Uout is tapped off from a voltage divider R1, R2 that is connected between the output terminals AK1, AK2. The regulator 10, which produces the second signal RS, is preferably a proportional regulator or a proportional integral regulator.

The drive circuit also has a ramp signal production circuit 30, which produces a ramp signal RPS synchronized in time with an oscillator signal OS. The oscillator signal OS is produced by an oscillator OSC, which is connected to the ramp signal production circuit 30. In the exemplary embodiment, the slope of the ramp signal RPS is dependent on the second signal RS, which is likewise supplied to the ramp signal production circuit.

The comparator circuit 40 compares the threshold signal DS with the ramp signal RPS, for which purpose the threshold signal DS and the ramp signal RPS are supplied to a comparator K, whose output signal KS is supplied to a logic circuit LG, which drives the switch S.

The logic circuit LG is designed such that the switch S can be closed when the ramp signal RPS reaches the same value as the threshold signal DS. The ramp signal production circuit 30 produces the ramp signal in such a way, for example, that the amplitude of the ramp signal rises with a slope which is dependent on the second signal RS on each falling edge of an oscillator signal, and is reset by the next rising edge of the clock signal OS, in order to rise once again. In the circuit shown in FIG. 1, the switch S is opened again whenever the ramp signal RPS is reset, or with each clock cycle of the oscillator signal OS. To do this, the oscillator signal OS is also supplied to the logic circuit LG.

FIG. 3 is provided for illustrating the method, which is carried out using the drive circuit shown in FIG. 1, for driving the switch S, on the basis of time profiles of the oscillator signal OS, the ramp signal RPS, the threshold signal DS and the drive signal AS. These signals are shown one above the other in three timing diagrams in FIG. 3.

As is illustrated in the figure, the ramp signal RPS includes successive ramps, which each rise within one clock period of the oscillator signal OS. These "ramps" in the example are reset to a predetermined value at each rising edge of the oscillator signal OS, and rise once again after the next falling edge of the oscillator signal. The individual clock pulses of the oscillator signal OS are short in comparison to the overall period duration, so that the time period between two successive ramps is likewise short in comparison to the time duration of the ramps.

The slope with which the individual ramps rise within each clock period of the oscillator signal OS, is dependent on the output voltage Uout, via the second signal RS that controls the output voltage of the voltage converter.

The drive signal AS is produced as a function of a comparison of the ramp signal RPS with the threshold signal DS, with the drive signal AS assuming a high level in order to close the switch S when the ramp signal RPS reaches the value of the threshold signal DS, and with the drive signal AS assuming the value of a low level when the ramp signal RPS is reset on the next rising edge of the clock signal OS.

The second signal RS is used as a load-dependent control signal for controlling the power consumption of the switch-mode converter. The value of this second signal RS rises when the power consumption of the load increases, with the slope of the ramp signal RPS then increasing, so that the ramp signal RPS intersects the threshold signal DS at an earlier time, so that the duration of the drive pulses AS is lengthened, in order in this way to increase the power consumption.

The control signal RS is derived from the output voltage Uout, in which case the control signal RS may be proportional to the output voltage Uout, or proportional to the difference between a nominal value and the output voltage Uout, in which case a load-dependent control error then remains between a nominal value and the output voltage Uout. The control signal RS may also be related to the output voltage Uout via a proportional integral relationship, and this allows any control error between the output voltage Uout and a nominal value to be reduced, although this lengthens the reaction response to changes in the load or in the output voltage.

In the inventive method, in which the slope of the ramp signal RPS is dependent not only on the power consumption of the load, but also on the threshold signal DS, the dynamic range of the threshold signal DS is on the one hand reduced in comparison to known methods and apparatuses, while, on the other hand, the system reacts more quickly to fluctuations in the power consumption of the load. When the power consumption of the load rises, then, first, the slope of the ramp signal RPS rises while, second, the amplitude of the threshold voltage DS is reduced, since this threshold signal DS is proportional to the reciprocal of the control signal RS, so that these two effects, which act in the same sense, result in a somewhat greater power consumption.

When the instantaneous value of the oscillating input voltage falls, then the threshold value DS falls in a corresponding manner, and this results in longer switched-on durations in order to keep the power consumption constant overall, as will be described with reference to the profile, shown by a dashed-dotted line, of the threshold signal DS and the associated dashed-dotted profile of the drive signal in FIG. 3.

Overall, in the case of the drive circuit, the power consumption is dependent on the square of the control signal RS, since the control signal RS on the one hand influences the slope of the ramp signal RS and on the other hand influences the amplitude of the threshold signal DS.

Figure 2:
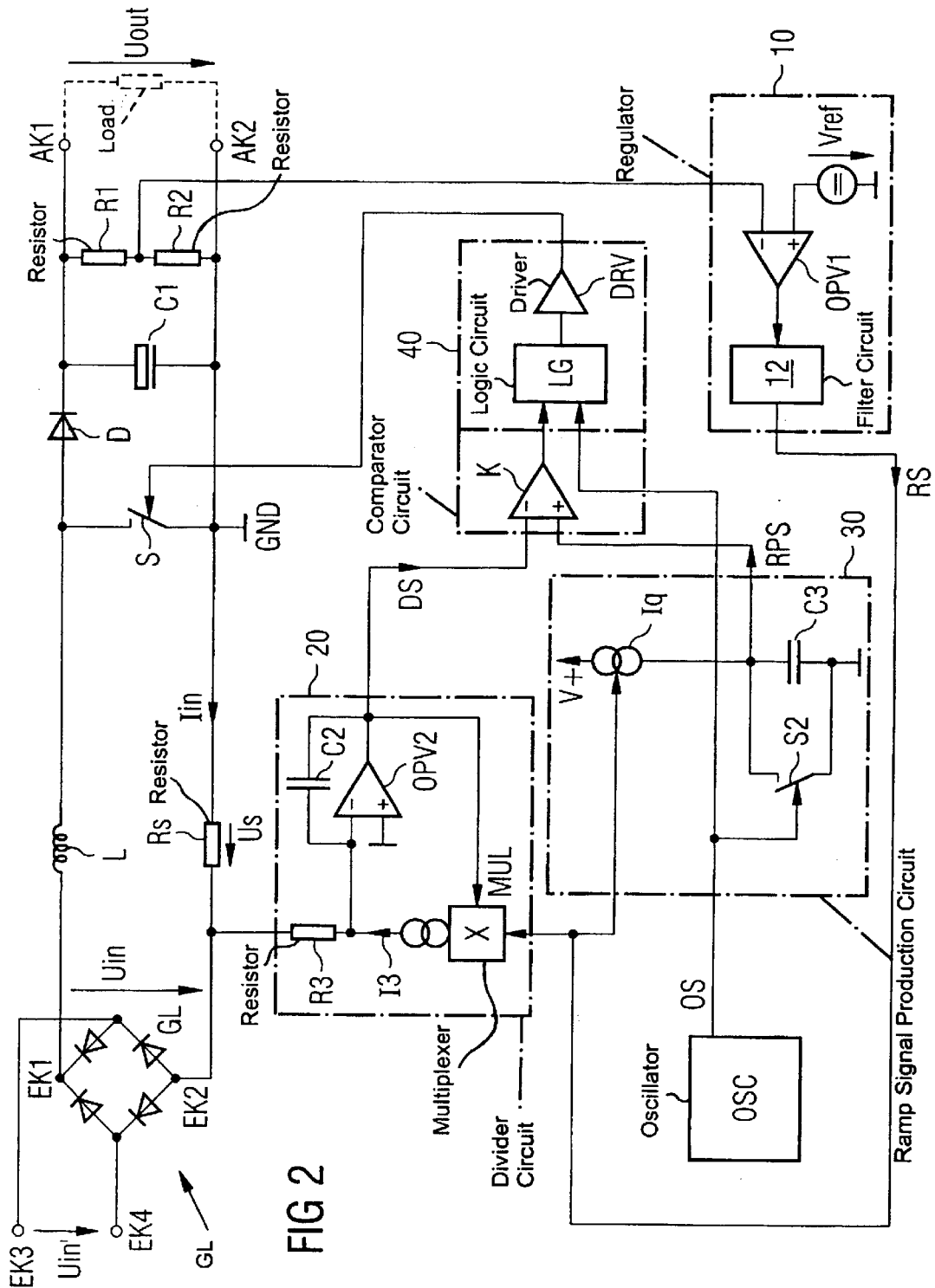
FIG. 2 is a detailed circuit diagram of a first embodiment of a drive circuit.

FIG. 2 shows an exemplary embodiment of the voltage converter shown in FIG. 1, with examples of specific circuits for the regulator 10, for the divider circuit 20 and for the ramp signal production circuit 30.

In the exemplary embodiment, the regulator 10 has a reference voltage source Vref and a differential operational amplifier OPV1, which compares a signal (which is proportional to the output voltage Uout and is produced by the voltage divider R1, R2) with the reference voltage Vref. The output circuit from the differential amplifier OPV1 is supplied to a filter circuit 12, at whose output the control signal RS is produced, with the regulator 10 overall preferably having a proportional response or a proportional integral response, and producing the control signal RS which is dependent on the output voltage.

In the exemplary embodiment, a current detection resistor Rs is connected in the input circuit of the voltage converter, and a voltage Us that is proportional to the input current Iin is applied to this current detection resistor Rs. One terminal of this current detection resistor Rs is connected to the reference ground potential GND, with respect to which the output voltage Uout is produced. The other terminal of the current detection resistor Rs is connected to one input of the divider circuit 20, and the control signal RS is supplied to another input of the divider circuit 20. The threshold signal DS is available at one output of the divider circuit 20. In the exemplary embodiment, the divider circuit 20 has a multiplier MUL. One of the inputs of the multiplier MUL is supplied with the control signal RS, and the other input of the multiplier MUL is supplied with the threshold signal DS. A current I3, which is proportional to the product of the threshold signal DS and the control signal RS, is produced at the output of the multiplier MUL. This current I3 causes a voltage drop U3 across a resistor R3 which is connected between the output of the multiplier MUL and the current detection resistor RS. The divider circuit 20 also has a differential amplifier OPV2, whose negative input is connected to one connection of the resistor R3, facing the multiplier MUL, and whose positive input is connected to the reference ground potential GND. The differential amplifier OPV3 varies the threshold signal DS such that the voltage which is produced across the resistor R3 by the current I3 corresponds to the voltage across the current detection resistor Rs. The current I3 is then proportional to the product of the threshold signal DS and the control signal RS, or the threshold signal DS is (ignoring the units) proportional to the quotient of the input current Iin and the control signal RS.

In the exemplary embodiment, the output of the differential amplifier OPV2 is fed back to the negative input by a capacitor C2. This results in a low-pass response, with a cutoff frequency that is dependent on the control signal RS. The capacitor C2 provides frequency-dependent negative feedback for the differential amplifier OPV2. When the value of the control signal RS is low because the power consumption of the switch-mode converter is low, then the operational amplifier OPV2 has high gain and the frequency-dependent negative feedback is highly effective, so that the low-pass filter has a low cut-off frequency. When the load is low, that is to say when the power consumption is low, the mean value of the current through the current detection resistor RS is thus used to form the threshold signal DS, which improves the power factor correction of the switch-mode converter when it is operating in the discontinuous current mode (DCM) because the load is low.

When the control signal RS has a high value because the power consumption is high, then the operational amplifier has low gain, which has a positive effect on the stability of the current control loop of the switch-mode converter, which operates in the continuous current mode when the power consumption is high.

In the exemplary embodiment, the ramp signal production circuit 30 has a current source Iq, which is connected in series with a capacitor C3 between a supply potential V+ and a reference ground potential GND. The ramp signal RPS is tapped off as a voltage across the capacitor C3. The current source Iq is controlled by the control signal RS, and produces a current which is dependent on the control signal RS. A switch S2 is connected in parallel with the capacitor C3 and is driven by the oscillator signal OS that is supplied from the oscillator OSC. The switch S2 is closed on each rising edge of the oscillator signal OS, in order in this way to discharge the capacitor C3, to set the ramp signal RPS to zero, and to discharge the capacitor C3. When the switch S2 is opened, the capacitor C3 is charged via the current source Iq after each falling edge of the oscillator signal OS, so that the voltage across the capacitor C3 rises. The slope of the voltage rise is in this case proportional to the current which is supplied from the current source Iq, and/or proportional to the control signal RS.

In the exemplary embodiment, the comparator circuit 40 which drives the switch S has (in addition to a comparator K to which the threshold signal DS and the ramp signal RPS are supplied) a logic circuit LG to which the comparator signal KS and the oscillator signal OS are supplied, and a driver circuit DRV which is connected downstream from the output of the logic circuit LG and converts the logic signal that is produced at the output of the logic circuit LG to a drive potential which is suitable for driving a switch. In the simplest case, the logic circuit LG is an RS flipflop, to whose set input the comparator signal KS is supplied, and to whose reset input the oscillator signal OS is supplied.

FIG. 4 shows an exemplary embodiment of a drive circuit according to the invention which has a filter FG with a nonlinear characteristic. The input of this filter FG is supplied with the control signal RS that is produced at the output of a regulator 10. The output of the filter provides a modified control signal RS1 that is dependent on the control signal RS and is supplied to the divider circuit 20 as the second signal, and to the ramp signal production circuit 30 in order to vary the slope of the ramp signal RPS. The filter circuit FG preferably has an exponential characteristic, so that the modified control signal RS1 is exponentially dependent on the control signal RS. This results in an improvement in the control response of the circuit configuration, particularly in response to major changes in the input voltage Uin. In addition, the modified control signal RS1, which is supplied to the converter 20, can never become zero when the function is exponential, so that it is impossible for any unacceptable division by zero to occur.

Figure 5A:
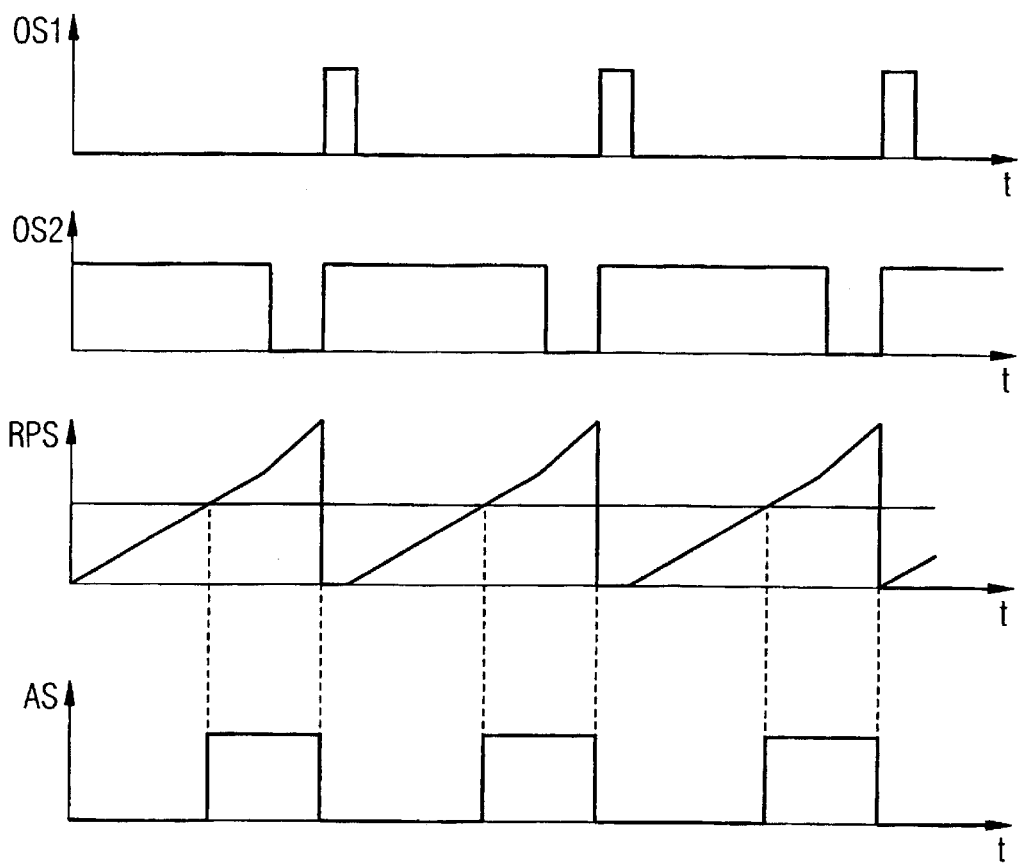
FIG. 5A is a graph showing the time profiles of some signals that are shown in FIG. 4 in the case with a normal or high power consumption.

The second oscillator signal OS2, which is supplied from the oscillator OSC2, is thus matched to the oscillator signal OS such that the current source Iq2 is switched on for a predetermined time period, which is shorter than the period duration of the oscillator signal OS. The time period, for which the current source Iq2 is switched on, ends with the rising edge of the oscillator signal OS. FIG. 5a shows an example of the time profile of the oscillator signal OS and of the time profile of the oscillator signal OS2 that is matched to it, with the latter driving the current source Iq. The period durations of the oscillator signals OS and OS2 match one another, with the oscillator signal OS2 assuming a high level for most of the period duration, in order to switch on the current source Iq2. For a time period toff before the next rising edge of the oscillator signal OS, the second oscillator signal OS2 falls to a low level, in order to switch off the current source Iq2. This results in a ramp signal RPS, which is likewise illustrated in FIG. 5a, whose slope rises within the time period toff before the next rising edge of the oscillator signal OS.

As long as the threshold signal DS is sufficiently low that the drive pulses of the drive signal OS start even before the slope of the ramp signal RPS increases, this increase in the slope of the ramp signal RPS has no effect on the control response of the circuit configuration.

Figure 5B:
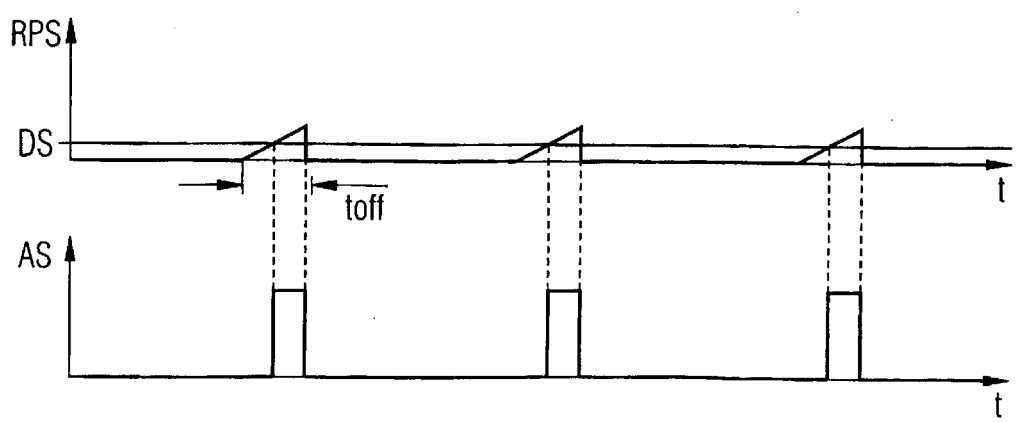
FIG. 5B is a graph showing the time profiles of some signals that are shown in FIG. 4 in the case with a low power consumption.

This increase in the slope becomes effective only when, as is illustrated in FIG. 5b, the power consumption of the load is so low that the slope of the ramp signal RPS is very low, in order in this way to achieve short drive pulses AS and hence a low power consumption. The increase in the slope of the ramp signal RPS shortly before the ramp signal RPS is next reset means that the ramp signal RPS always reaches the threshold signal DS close to the time period toff, in order to switch on the switch S for a short time within each clock period.

Figure 6:
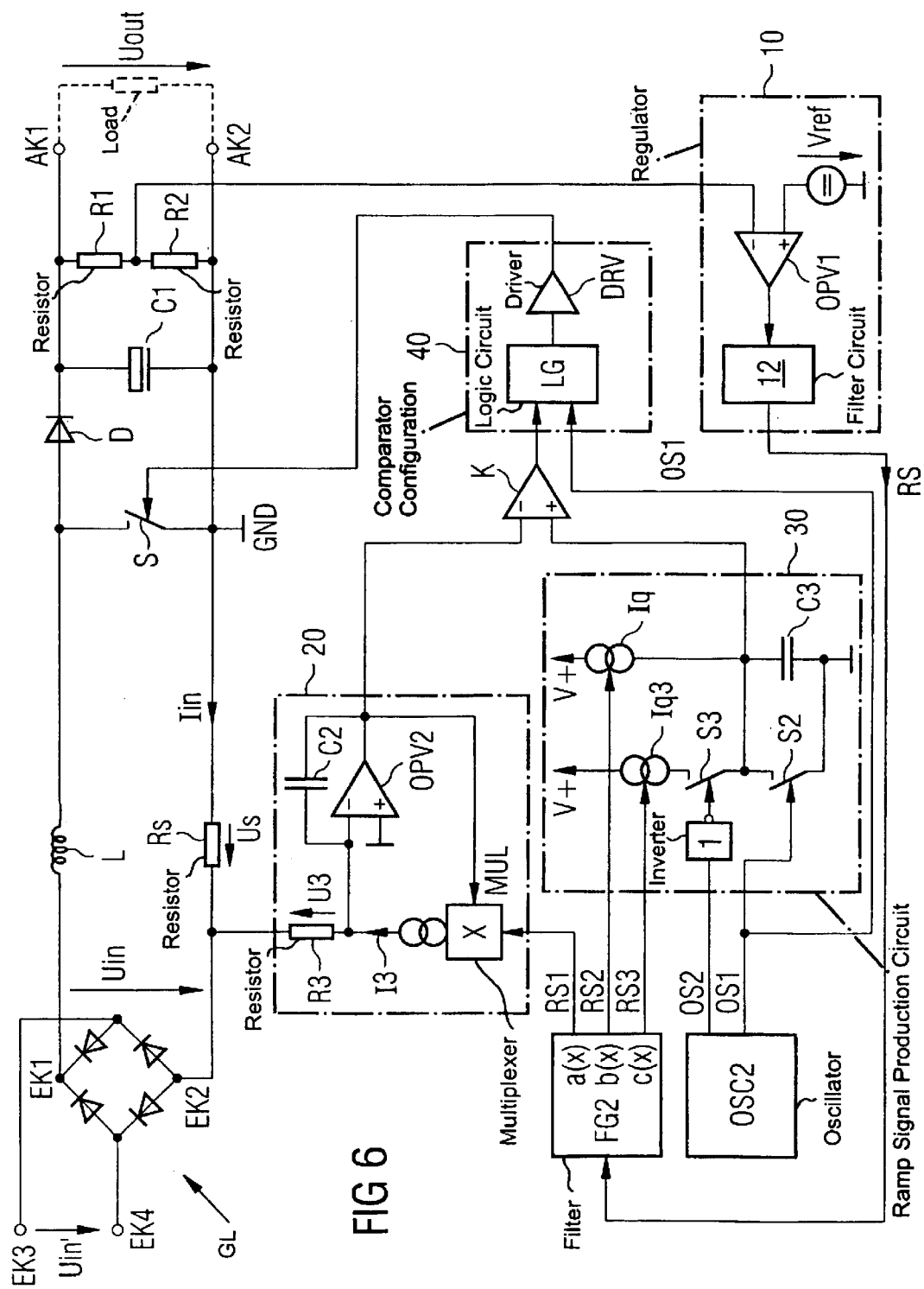
FIG. 6 is a circuit diagram of a third embodiment of the drive circuit.

FIG. 6 shows a drive circuit modified from that shown in FIG. 4, which has a filter circuit FG2 to which the control signal RS is supplied, and at whose output a first control signal RS1 and a second control signal RS2 are produced. The first control signal RS1 is supplied as the second signal to the divider circuit 20, and the second control signal RS2 is used to vary the slope of the ramp signal RPS, and drives the current source Iq that is connected in series with the capacitor C3. The first control signal RS1 is obtained from the control signal RS via a nonlinear characteristic, and the second control signal RS2 is likewise obtained from the control signal RS via a nonlinear characteristic. Examples of the characteristic a(x) via which the first control signal RS1 is dependent on the control signal RS, and of the characteristic b(x) via which the second control signal RS2 is dependent on the control signal RS are shown at the top, by way of example, in FIG. 7. The product of the functions a(x) and b(x) is preferably an exponential function.

The ramp signal production circuit 30 shown in FIG. 6 differs from that shown in FIG. 1 in that a series circuit having a current source Iq3 and a switch S3 connected in series is connected in parallel with the current source Iq and in that the current source Iq is connected in series with the capacitor C3. The switch S3 is driven via an inverter 1 by the oscillator signal OS2, so that the switch S3 is in each case closed shortly before the next rising edge of the oscillator signal OS, in order, in addition to the current source Iq, to charge the capacitor C3 by way of the current which is produced by the current source Iq3, and hence to increase the slope of the ramp signal RPS within the time period toff that is governed by the oscillator signal OS2. The current source Iq3 is driven by a third control signal RS3, which is dependent on the control signal RS, preferably on the basis of the characteristic that is shown at the bottom in FIG. 7. The current source Iq3 then produces a current for as long as the control signal RS is below a limit value RSlim, since it is only when the power consumption of the load is low that the control signal RS assumes a sufficiently low value for it to be necessary to increase the slope of the ramp signal, in order to ensure that the switch is closed once during each period duration.

I claim:

1. A method for driving a switch in a switch-mode converter having input terminals for supplying an input voltage and output terminals for providing an output voltage, the method which comprises:

producing a threshold signal dependent on a quotient of a first signal dependent on an input current to the switch-mode converter and a second signal dependent on the output voltage;

producing a ramp signal synchronously in time with a clock signal, the ramp signal having a slope dependent on the output voltage; and obtaining a comparison result by comparing the threshold signal with the ramp signal and driving the switch as a function of the comparison result.

2. The method according to claim 1, which further comprises:

placing the switch in a first switching state when the ramp signal reaches a value of the threshold signal; and placing the switch in a second switching state synchronously with the clock signal.

3. The method according to claim 2, which further comprises closing the switch in the first switching state and opening the switch in the second switching state.

4. The method according to claim 1, which further comprises:

producing a control signal dependent on the output voltage; and ensuring that the second signal is related to the control signal by a nonlinear characteristic.

5. The method according to claim 4, wherein the second signal is at least approximately exponentially dependent on the control signal.

6. The method according to claim 1, which further comprises:

producing a control signal dependent on the output voltage; and ensuring that the slope of the ramp signal is related to the control signal by a nonlinear characteristic.

7. The method according to claim 1, which further comprises:

producing a control signal that is dependent on the output voltage;

ensuring that the second signal is related to the control signal by a first nonlinear characteristic;

ensuring that the slope of the ramp signal is related to the control signal by a second nonlinear characteristic; and producing an at least approximately exponential characteristic from a product of the first nonlinear characteristic and the second nonlinear characteristic.

8. The method according to claim 1, which further comprises:

resetting the ramp signal synchronously with the clock signal; and ensuring that the slope of the ramp signal increases for a predetermined time period before performing the resetting step.

9. The method according to claim 8, wherein, before performing the resetting step, a value of an increase in the slope of the ramp signal is dependent on the output voltage.

10. The method according to claim 1, which further comprises, before performing the step of obtaining the comparison result, low-pass filtering the threshold signal using a cut-off frequency dependent on the second signal.

11. A drive circuit for a switch in a switch-mode converter having input terminals for obtaining an input voltage and output terminals for providing an output voltage, the drive circuit comprising:

a threshold signal production circuit for producing a threshold signal;

a ramp signal production circuit for producing a ramp signal synchronously with a clock signal, the ramp signal having at least in portions with a slope dependent on the output voltage; and a comparator circuit for producing an output signal for driving the switch, said comparator circuit receiving the threshold signal and the ramp signal;

said threshold signal production circuit being a divider circuit;

said divider circuit receiving a first signal dependent on an input current to the switch-mode converter;

said divider circuit receiving a second signal dependent on the output voltage; and said divider circuit producing an output signal dependent on a quotient of the first signal and the second signal.

12. The drive circuit according to claim 11, wherein: said divider circuit has a low-pass filter with a cut-off frequency that is dependent on the second signal; and said low-pass filter has an output providing the threshold signal.

13. The drive circuit according to claim 11, in combination with the switch-mode converter, wherein: the switch-mode converter has an input circuit with a current detection resistor connected therein; and the current detection resistor has a terminal connected to a reference ground potential and another terminal connected to said divider circuit.

14. The drive circuit according to claim 13, further comprising:

a multiplier having an input receiving the second signal and another input receiving the threshold signal, said multiplier having an output for providing a current dependent on a product of the second signal and the threshold signal;

a resistor connected between said output of said multiplier and the current detection resistor; and a differential amplifier having an input connected to said output of said multiplier and another input connected to the reference ground potential, said differential amplifier having an output for providing the threshold signal.

15. The drive circuit according to claim 14, further comprising a capacitive circuit feeding said output of said differential amplifier to said input of said differential amplifier connected to said output of said multiplier.

16. The drive circuit according to claim 11, further comprising a filter with a nonlinear characteristic, said filter having an input receiving a signal dependent on the output voltage, and said filter having output providing the second signal.

17. The drive circuit according to claim 16, wherein said filter has an at least approximately exponential characteristic.

18. The drive circuit according to claim 11, wherein the second signal is supplied to said ramp signal production circuit.

19. The drive circuit according to claim 11, further comprising:

a filter receiving a filter input signal dependent on the output voltage;

said filter for producing the second signal and a slope signal;

the slope signal being supplied to said ramp signal production circuit; and a product of the second signal and the slope signal related to the filter input signal by a nonlinear characteristic.

20. The drive circuit according to claim 19, wherein the nonlinear characteristic is an at least approximately exponential characteristic.

21. The drive circuit according to claim 11, further comprising an oscillator circuit for producing an oscillator signal, the oscillator signal supplied to said comparator circuit, and the oscillator signal supplied to said ramp signal production circuit as the clock signal.

22. The drive circuit according to claim 21, wherein said oscillator circuit produces a second oscillator signal, supplied to said ramp signal production circuit.

23. The drive circuit according to claim 22, wherein said ramp signal production circuit is designed to increase the slope of the ramp signal synchronously with the second oscillator signal.

24. The drive circuit according to claim 23, wherein a value of an increase in the slope of the ramp signal is constant.

25. The drive circuit according to claim 23, wherein a value of an increase in the slope of the ramp signal is dependent on the output voltage.

* * * * *